United States Patent
Masuko

(10) Patent No.: US 9,953,364 B2
(45) Date of Patent: Apr. 24, 2018

(54) INFORMATION PROCESSING SYSTEM, INFORMATION PROCESSING SYSTEM CONTROL METHOD, INFORMATION PROCESSING DEVICE, INFORMATION PROCESSING DEVICE CONTROL METHOD, PROGRAM, AND INFORMATION STORAGE MEDIUM

(71) Applicant: Rakuten, Inc., Tokyo (JP)

(72) Inventor: Soh Masuko, Tokyo (JP)

(73) Assignee: Rakuten, Inc., Tokyo (JP)

( * ) Notice: Subject to any disclaimer, the term of this patent is extended or adjusted under 35 U.S.C. 154(b) by 195 days.

(21) Appl. No.: 15/031,272

(22) PCT Filed: Oct. 25, 2013

(86) PCT No.: PCT/JP2013/079046
§ 371 (c)(1),
(2) Date: Apr. 22, 2016

(87) PCT Pub. No.: WO2015/059837
PCT Pub. Date: Apr. 30, 2015

(65) Prior Publication Data
US 2016/0253744 A1    Sep. 1, 2016

(51) Int. Cl.
*G06F 3/00* (2006.01)
*G06Q 30/06* (2012.01)
(Continued)

(52) U.S. Cl.
CPC ....... *G06Q 30/0643* (2013.01); *G06F 3/0482* (2013.01); *G06F 3/0484* (2013.01); *G06Q 30/06* (2013.01)

(58) Field of Classification Search
CPC .................................................. G06F 3/0482
(Continued)

(56) References Cited

U.S. PATENT DOCUMENTS 7,676,761 B2 * 3/2010 Oliver ................... G06F 9/4443
                                                                715/783
9,841,873 B1 * 12/2017 Schroeder ............. G06F 3/0482
(Continued)

FOREIGN PATENT DOCUMENTS

| JP | 2003-091652 A | 3/2003 |
| JP | 2011-159060 A | 8/2011 |
| WO | 2011/093358 A1 | 8/2011 |

OTHER PUBLICATIONS

"What is FashionNavi?", [online], [retrieved on Oct. 18, 2013], Internet http://visseeker.yahoo-labs.jp/fn/help.html Pertinent parts discussed in "Background Art" of the specification.
(Continued)

*Primary Examiner* — William Titcomb
(74) *Attorney, Agent, or Firm* — HEA Law PLLC

(57) ABSTRACT

A first display control unit displays, on a display unit, a first screen relating to a list of selection candidates serving as candidates to be selected by a user. The first display control unit displays the first screen on which a plurality of the same or similar selection candidates are aggregated into one representative selection candidate. A display object setting unit sets, as a display object to be displayed on a second screen that is displayed when the user selects the representative selection candidate, any one of the plurality of selection candidates that are aggregated into the representative selection candidate based on information on at least two selection candidates among the plurality of selection candidates. A second display control unit displays, on the display unit, when the user selects the representative selection candidate, the second screen relating to the selection candidate set as the display object.

6 Claims, 13 Drawing Sheets

(51) Int. Cl.
*G06F 3/0482* (2013.01)
*G06F 3/0484* (2013.01)

(58) Field of Classification Search
USPC .......................................................... 715/762
See application file for complete search history.

(56) References Cited

U.S. PATENT DOCUMENTS

| | | | |
|---|---|---|---|
| 2003/0040850 A1* | 2/2003 | Najmi .................... | G06F 3/0482 701/1 |
| 2007/0188472 A1* | 8/2007 | Ghassabian .............. | B41J 3/445 345/169 |
| 2014/0282586 A1* | 9/2014 | Shear ..................... | G06F 9/5072 718/104 |
| 2015/0261429 A1* | 9/2015 | Ghassabian ........... | G06F 3/0482 715/773 |
| 2016/0175715 A1* | 6/2016 | Ye ........................... | A63F 13/58 715/757 |
| 2017/0220540 A1* | 8/2017 | Wang .................... | G06F 17/241 |

OTHER PUBLICATIONS

Partial Translation of the Office Action for corresponding JP application No. 2014-555647.
English translation of the International Search Report for PCT/JP2013/079046 dated Dec. 17, 2013.

\* cited by examiner

FIG.3

| DISPLAY ORDER | PRODUCT | STORE | SALES PRICE | PRODUCT IMAGE | DISPLAY PRIORITY LEVEL |
|---|---|---|---|---|---|
| 1 | BAG A | STORE S1 | 20000 YEN | a_s1.jpg | 90 |
| 2 | BAG A | STORE S2 | 20000 YEN | a_s2.jpg | 70 |
| 3 | BAG B | STORE S1 | 15000 YEN | b_s1.jpg | 60 |
| 4 | BAG B | STORE S3 | 15000 YEN | b_s3.jpg | 50 |
| 5 | BAG A | STORE S3 | 21000 YEN | a_s3.jpg | 40 |
| 6 | BAG C | STORE S1 | 18000 YEN | c_s1.jpg | 38 |
| 7 | BAG D | STORE S2 | 10000 YEN | d_s2.jpg | 35 |
| 8 | BAG E | STORE S1 | 12000 YEN | e_s1.jpg | 33 |
| 9 | BAG F | STORE S4 | 13000 YEN | f_s4.jpg | 30 |
| 10 | BAG A | STORE S4 | 21000 YEN | a_s4.jpg | 27 |
| 11 | BAG B | STORE S4 | 16000 YEN | b_s4.jpg | 26 |
| 12 | BAG C | STORE S4 | 16000 YEN | c_s4.jpg | 25 |
| 13 | BAG G | STORE S3 | 10000 YEN | g_s3.jpg | 23 |
| 14 | BAG G | STORE S4 | 10000 YEN | g_s4.jpg | 20 |
| 15 | BAG H | STORE S5 | 18000 YEN | h_s5.jpg | 18 |
| 16 | BAG I | STORE S5 | 12000 YEN | i_s5.jpg | 15 |
| ... | ... | ... | ... | ... | ... |

| STORE ID | STORE NAME | LOCATION |
|---|---|---|
| S1 | STORE S1 | ----- |
| S2 | STORE S2 | ----- |
| S3 | STORE S3 | ----- |
| S4 | STORE S4 | ----- |
| S5 | STORE S5 | ----- |
| ... | ... | ... |

| PRODUCT ID | BASIC NAME | CATEGORY |
|---|---|---|
| P1 | BAG A | ----- |
| P2 | BAG B | ----- |
| P3 | BAG C | ----- |
| P4 | BAG D | ----- |
| P5 | BAG E | ----- |
| ... | ... | ... |

| STORE ID | PRODUCT ID | PRODUCT NAME | SALES PRICE | PRODUCT IMAGE | PRODUCT PAGE |
|---|---|---|---|---|---|
| S1 | P1 | BAG A | 20000 YEN | --- | --- |
| S1 | P2 | BAG B | 15000 YEN | --- | --- |
| ... | ... | ... | ... | ... | ... |

INFORMATION PROCESSING SYSTEM, INFORMATION PROCESSING SYSTEM CONTROL METHOD, INFORMATION PROCESSING DEVICE, INFORMATION PROCESSING DEVICE CONTROL METHOD, PROGRAM, AND INFORMATION STORAGE MEDIUM

CROSS REFERENCE TO RELATED APPLICATIONS

This application is a National Stage of International Application No. PCT/JP2013/079046 filed on Oct. 25, 2013. The contents of the above document is incorporated herein by reference in its entirety.

TECHNICAL FIELD

The present invention relates to an information processing system, a control method for an information processing system, an information processing device, a control method for an information processing device, a program, and an information storage medium.

BACKGROUND ART

There is known an information processing system configured to display, when a user selects any one of selection candidates from a list of selection candidates displayed on a list screen, a screen relating to the selected selection candidate. For example, as an example of the above-mentioned information processing system, there is known an electronic commerce system configured to display, when a user selects any one of products from a list of products displayed on a list screen, a product screen relating to the selected product.

Incidentally, in an electronic commerce system providing a virtual shopping mall in which a plurality of stores are opened, the same product is sold by a plurality of stores. Thus, a plurality of the same products may be displayed on the list screen.

In this respect, in a related-art electronic commerce system, a plurality of the same product images are aggregated in order to prevent the plurality of the same product images from being displayed on the list screen. That is, any one of those product images is displayed on the list screen as a representative product image representing the plurality of the same product images, and the other product images among those product images are not displayed on the list screen. Further, when the user selects the representative product image, a product screen of a product corresponding to the representative product image is displayed. Further, when the user performs a predetermined operation on the representative product image, the plurality of aggregated product images are displayed, and then when the user selects any one of those plurality of product images, a product screen of a product corresponding to the selected product image is displayed.

CITATION LIST

Non Patent Literature

[Non Patent Literature 1] "What is FashionNavi?", [on-line], [retrieved on Oct. 18, 2013], Internet <http://visseek-er.yahoo-labs.jp/fn/help.html>

SUMMARY OF INVENTION

Technical Problem

In the electronic commerce system described above, when the user desires to refer to a product screen of a product corresponding to a product image other than the representative product image among a plurality of aggregated product images, the user needs to perform an operation of selecting a product image other than the representative product image from among the plurality of product images, after performing a predetermined operation on the representative product image. In other words, the user needs to perform a large number of operations in the above-mentioned case.

The present invention has been made in view of the above-mentioned problem, and it is an object of the present invention to provide an information processing system, a control method for an information processing system, an information processing device, a control method for an information processing device, a program, and an information storage medium capable of reducing, when a plurality of the same or similar selection candidates are aggregated to be displayed on a screen showing a list of selection candidates, the number of operations to be performed by a user to refer to a screen relating to a selection candidate other than a representative selection candidate among the plurality of aggregated selection candidates.

Solution to Problem

In order to solve the above-mentioned problem, an information processing system according to one embodiment of the present invention includes: first display control means for displaying, on display means, a first screen relating to a list of selection candidates serving as candidates to be selected by a user, the first screen being a screen on which a plurality of the same or similar selection candidates are aggregated into one representative selection candidate; display object setting means for setting, as a display object to be displayed on a second screen that is displayed when the user selects the representative selection candidate, any one of the plurality of the selection candidates that are aggregated into the representative selection candidate based on information on at least two selection candidates among the plurality of selection candidates; and second display control means for displaying, on the display means, when the user selects the representative selection candidate, the second screen relating to the one of the plurality of selection candidates set as the display object.

Further, a control method for an information processing system according to one embodiment of the present invention includes: a first display control step of displaying, on display means, a first screen relating to a list of selection candidates serving as candidates to be selected by a user, the first screen being a screen on which a plurality of the same or similar selection candidates are aggregated into one representative selection candidate; a display object setting step of setting, as a display object to be displayed on a second screen that is displayed when the user selects the representative selection candidate, any one of the plurality of selection candidates that are aggregated into the representative selection candidate based on information on at least two selection candidates among the plurality of selection candidates; and a second display control step of displaying, on the display means, when the user selects the representative selection candidate, the second screen relating to the one of the plurality of selection candidates set as the display object.

Further, an information processing device according to one embodiment of the present invention includes display object setting means for setting a display object to be displayed on a second screen that is displayed when a user selects a selection candidate displayed on a first screen relating to a list of selection candidates serving as candidates to be selected by the user, in which a plurality of the same or similar selection candidates are aggregated into one representative selection candidate to be displayed on the first screen, and in which the display object setting means sets, as a display object to be displayed on the second screen that is displayed when the user selects the representative selection candidate displayed on the first screen, any one of the plurality of selection candidates that are aggregated into the representative selection candidate based on information on at least two selection candidates among the plurality of selection candidates.

Further, a control method for an information processing device according to one embodiment of the present invention includes a display object setting step of setting a display object to be displayed on a second screen that is displayed when a user selects a selection candidate displayed on a first screen relating to a list of selection candidates serving as candidates to be selected by the user, in which a plurality of the same or similar selection candidates are aggregated into one representative selection candidate to be displayed on the first screen, and in which the display object setting step includes setting, as a display object to be displayed on the second screen that is displayed when the user selects the representative selection candidate displayed on the first screen, anyone of the plurality of selection candidates that are aggregated into the representative selection candidate based on information on at least two selection candidates among the plurality of selection candidates.

Further, a program according to one embodiment of the present invention is a program for causing a computer to function as display object setting means for setting a display object to be displayed on a second screen that is displayed when a user selects a selection candidate displayed on a first screen relating to a list of selection candidates serving as candidates to be selected by the user, in which a plurality of the same or similar selection candidates are aggregated into one representative selection candidate to be displayed on the first screen, and in which the display object setting means sets, as a display object to be displayed on the second screen that is displayed when the user selects the representative selection candidate displayed on the first screen, any one of the plurality of selection candidates that are aggregated into the representative selection candidate based on information on at least two selection candidates among the plurality of selection candidates.

Further, an information storage medium according to one embodiment of the present invention is a computer-readable information storage medium storing a program for causing a computer to function as display object setting means for setting a display object to be displayed on a second screen that is displayed when a user selects a selection candidate displayed on a first screen relating to a list of selection candidates serving as candidates to be selected by the user, in which a plurality of the same or similar selection candidates are aggregated into one representative selection candidate to be displayed on the first screen, and in which the display object setting means sets, as a display object to be displayed on the second screen that is displayed when the user selects the representative selection candidate displayed on the first screen, anyone of the plurality of selection candidates that are aggregated into the representative selection candidate based on information on at least two selection candidates among the plurality of selection candidates.

Further, in one aspect of the present invention, the display object setting means may set, as the display object, any one of the plurality of selection candidates that are aggregated into the representative selection candidate based on display priority level information on display priority levels of the at least two selection candidates among the plurality of selection candidates that are aggregated into the representative selection candidate.

Further, in one aspect of the present invention, the first display control means may display a list of images as the list of selection candidates on the first screen, and the display object setting means may set, as the display object, any one of the plurality of selection candidates that are aggregated into the representative selection candidate based on display size information on display sizes of the at least two selection candidates among the plurality of selection candidates that are aggregated into the representative selection candidate.

Further, in one aspect of the present invention, the display object setting means may include: means for setting probability information indicating probabilities of each of the plurality of selection candidates that are aggregated into the representative selection candidate to be determined as the display object based on the information on the at least two selection candidates among the plurality of selection candidates; and means for determining, as the display object, anyone of the plurality of selection candidates that are aggregated into the representative selection candidate based on the probability information.

Further, in one aspect of the present invention, the display object setting means may include: means for setting an upper limit on a number of times that each of the plurality of selection candidates that are aggregated into the representative selection candidate is determined as the display object, based on the information on the at least two selection candidates among the plurality of selection candidates; and means for determining, as the display object, any one of the plurality of selection candidates that are aggregated into the representative selection candidate such that a cumulative number of times that the one of the plurality of selection candidates is determined as the display object does not exceed the upper limit of the one of the plurality of selection candidates.

Further, in one aspect of the present invention, the information processing system may further include means for storing display object information indicating the one of the plurality of selection candidates set as the display object in storage means, in which the display object setting means may set, when the first screen is displayed again after the second screen relating to the one of the plurality of selection candidates set as the display object is displayed, a selection candidate indicated by the display object information as the display object again.

Further, in one aspect of the present invention, a list of products or services may be displayed on the first screen as the list of selection candidates, the information processing system may further include means for displaying, on the first screen, in accordance with an instruction of the user, sales prices of the respective products or services displayed on the first screen, and the first display control means may display, on the display means, when the sales prices of the respective products or services displayed on the first screen are displayed on the first screen, the first screen in which a plurality of the same or similar products or services having the same or similar sales prices are aggregated into the representative selection candidate.

Advantageous Effects of Invention

According to an embodiment of the present invention, it is possible to reduce, when a plurality of the same or similar selection candidates are aggregated to be displayed on a screen indicating a list of selection candidates, the number of operations to be performed by a user to refer to a screen relating to a selection candidate other than the representative selection candidate among the plurality of aggregated selection candidates.

BRIEF DESCRIPTION OF DRAWINGS

FIG. 3 is a table for showing an example of a search result.

DESCRIPTION OF EMBODIMENTS

Now, an exemplary embodiment of the present invention is described in detail with reference to the drawings. In the following, an example of a case is described in which the present invention is applied to an electronic commerce system that implements a virtual shopping mall in which a plurality of stores are opened. Specifically, the description is about an example of a case where an information processing system according to an embodiment of the present invention is implemented in an electronic commerce system.

Figure 1:
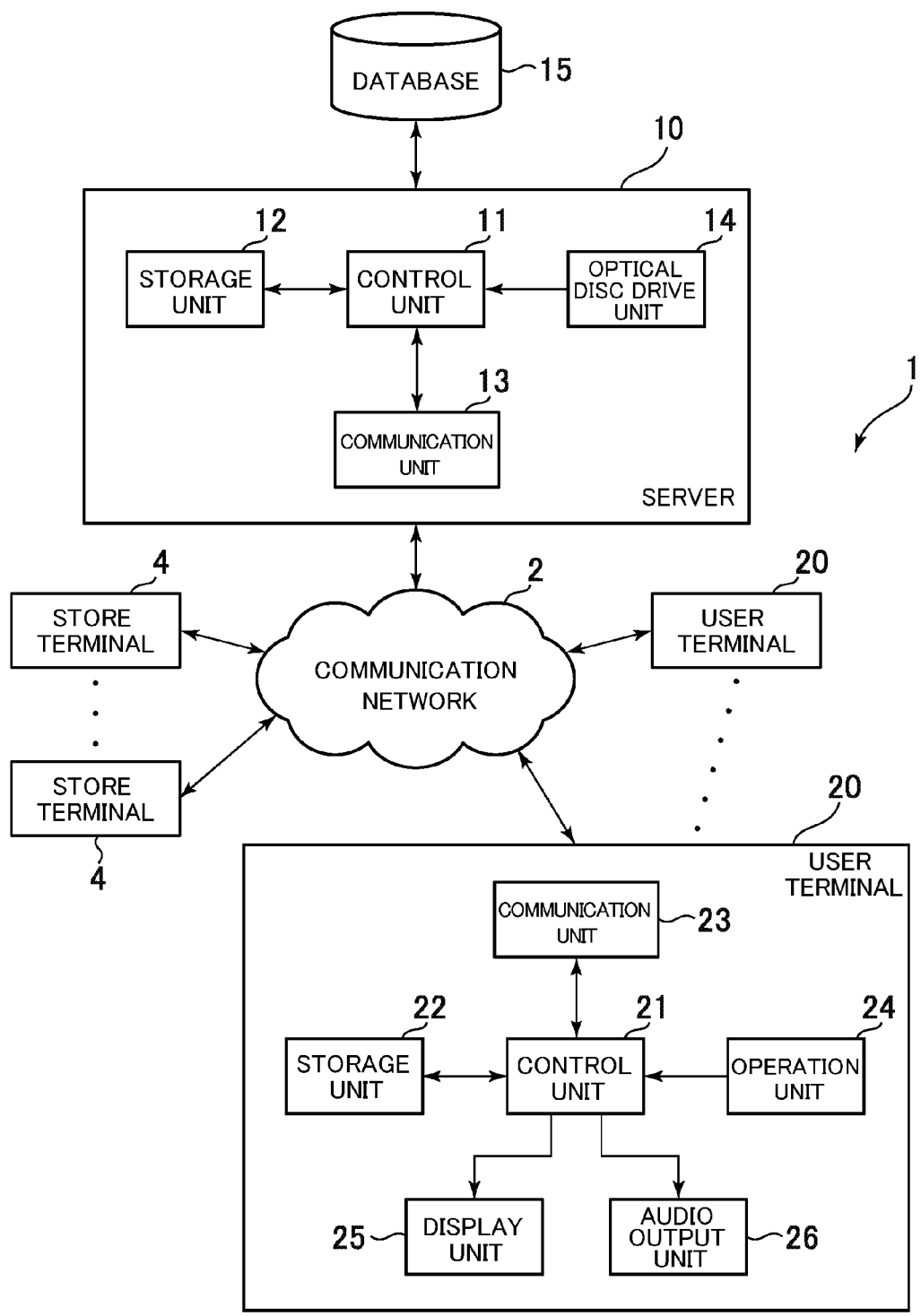
FIG. 1 is a diagram for illustrating an example of an overall configuration of an electronic commerce system (information processing system) according to an embodiment of the present invention.

FIG. 1 is an illustration of an example of an overall configuration of an electronic commerce system 1 (information processing system) according to an embodiment of the present invention. As illustrated in FIG. 1, the electronic commerce system 1 according to this embodiment includes a server 10, a database 15, a user terminal 20, and a store terminal 4. The server 10, the user terminal 20, and the store terminal 4 are connected to a communication network 2, which includes the Internet or the like. Mutual data communication is available between the server 10 and the user terminal 20. Mutual data communication is available also between the server 10 and the store terminal 4.

The server 10 is a server (information processing device) which functions as a portal of the virtual shopping mall. As illustrated in FIG. 1, the server 10 includes a control unit 11, a storage unit 12, a communication unit 13, and an optical disc drive unit 14. The control unit 11 includes one or a plurality of microprocessors and executes information processing in accordance with a program stored in the storage unit 12. The storage unit 12 includes a main memory unit (e.g., RAM) and an auxiliary storage unit (e.g., ROM, hard disk drive, or solid state drive). The communication unit 13 is configured to execute data communication via the communication network 2.

The optical disc drive unit 14 is configured to read a program or data recorded on an optical disc (information storage medium). The program or data is supplied to the storage unit 12 via an optical disc (information storage medium). Specifically, the program or data stored on the optical disc is read by the optical disc drive unit 14 and stored in the storage unit 12.

Note that, the server 10 may include a component (e.g., memory card slot unit) configured to read a program or data stored in an information storage medium other than the optical disc (e.g., memory card). Then, the program or data may be supplied to the storage unit 12 via the information storage medium other than the optical disc. Alternatively, a program or data may be supplied to the storage unit 12 via the communication network 2.

The server 10 can access the database 15. The database 15 stores, for example, data on a user using the virtual shopping mall, data on a store opened in the virtual shopping mall, data on a product available in the virtual shopping mall, and data on a history of a transaction made in the virtual shopping mall. Note that, the database 15 may be built in a server other than the server 10, and may be built in the server 10.

The user terminal 20 is an information processing device to be used by a user. For example, the user terminal 20 is a mobile phone (including smartphone), a tablet computer, a laptop computer, or a desktop computer.

As illustrated in FIG. 1, the user terminal 20 includes a control unit 21, a storage unit 22, a communication unit 23, an operation unit 24, a display unit 25, and an audio output unit 26. The control unit 21, the storage unit 22, and the communication unit 23 are the same as the control unit 11, the storage unit 12, and the communication unit 13 of the server 10.

A program or data is supplied to the storage unit 22 via the communication network 2. Note that, the user terminal 20 may include a component (e.g., optical disc drive unit or memory card slot unit) configured to read a program or data stored in an information storage medium (e.g., optical disc or memory card). Then, the program or data may be supplied to the storage unit 22 via the information storage medium (e.g., memory card).

The operation unit 24 is used by a user for operation. For example, when a pointing device for specifying a position in a screen displayed on the display unit 25 is provided in the user terminal 20, the pointing device corresponds to the operation unit 24. That is, for example, a mouse, a stick, a touch pad, or a touch panel overlaid on the display unit 25 corresponds to the operation unit 24.

The display unit 25 is, for example, a liquid crystal display or an organic EL display, and is configured to display various screens. The audio output unit 26 is, for example, a speaker or headphones, and is configured to output various sounds.

The store terminal 4 is an information processing device that is provided in the store opened in the virtual shopping mall. The store terminal 4 is used to register information on a product to be sold in the virtual shopping mall and other types of information in the database 15 via the server 10. For example, the store terminal 4 is a tablet computer, a laptop computer, or a desktop computer. The store terminal 4 has a hardware configuration similar to that of the user terminal 20.

For example, a daemon program (e.g., HTTP daemon) is executed on the server 10. Further, a program (e.g., web browser) is started on the user terminal 20, and a processing request (e.g., HTTP request) is transmitted from the user terminal 20 to the server 10. In this case, a processing result (e.g., HTTP response) corresponding to the above-mentioned processing request is transmitted to the user terminal 20 from the server 10. For example, data described in a page description language is transmitted to the user terminal 20. Then, a screen that is based on the processing result is displayed on the display unit 25 of the user terminal 20 on the basis of this data. Note that, similar processing is performed between the store terminal 4 and the server 10.

In the following, a description is given of a screen displayed on the display unit 25 of the user terminal 20 when the virtual shopping mall is used. The screen described below is displayed through execution of a data communication between the user terminal 20 and the server 10.

Figure 2:
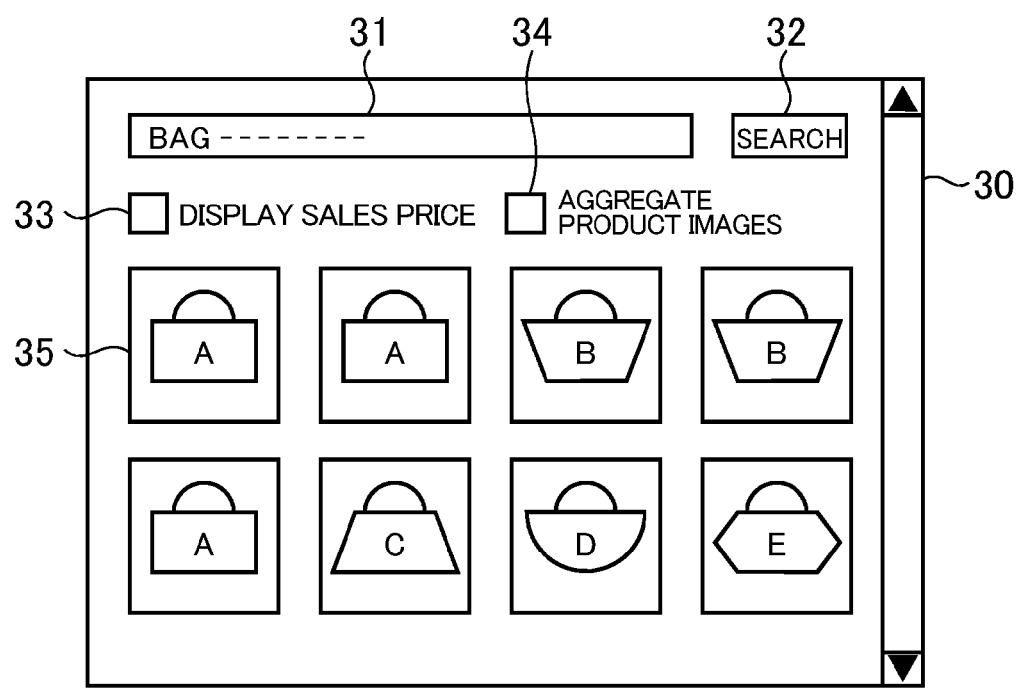
FIG. 2 is a diagram for illustrating an example of a list screen.

When the virtual shopping mall is used, the user uses the user terminal 20 to access the server 10. Then, the user specifies a search condition and searches for a product, to thereby look for a desired product. FIG. 2 is an illustration of an example of a list screen showing a list of products satisfying a search condition.

A list screen 30 illustrated in FIG. 2 includes an input box 31, a search button 32, a price checkbox 33, and an aggregation checkbox 34. A search condition (search keyword) is input to the input box 31 by the user. When the search button 32 is clicked, search processing is executed and a list of products satisfying the search condition input to the input box 31 is displayed on the list screen 30. Specifically, product images 35 of respective products satisfying the search condition are displayed on the list screen 30.

A product image 35 is an image registered by each store in advance. In general, a store uses an image provided by a manufacturer of a product as the product image 35. In the virtual shopping mall, there is a case where the same product is sold by a plurality of stores, but product images 35 of the same product are often the same or similar with each other. Note that, the product images 35 are registered by each store, and thus there is a case where the product images 35 of the same product are not the same or similar with each other.

Note that, in the following, it is assumed that a list of products as shown in FIG. 3 is acquired as a search result. In the example shown in FIG. 3, each of bags A sold by a plurality of stores, namely, S1, S2, S3, and S4, is contained in the search result. Further, each of bags B sold by a plurality of stores, namely, S1, S3, and S4, is contained in the search result. Further, each of bags C sold by a plurality of stores, namely, S1 and S4, is contained in the search result. Further, each of bags G sold by a plurality of stores, namely, S3 and S4, is contained in the search result.

Further, as shown in FIG. 3, in the electronic commerce system 1, a display priority level is determined for each combination of a store and a product. In the example shown in FIG. 3, it is indicated that as the value of the display priority level becomes larger, the display priority level becomes higher. As the display priority level becomes higher, the product image 35 is displayed on the list screen 30 more preferentially. That is, the display order of the product images 35 on the list screen 30 is set based on the display priority levels. For example, descending order of the display priority level is set as the display order of the product image 35 on the list screen 30.

For example, the display priority level is determined in consideration of a relationship between a product and a search keyword. For example, the display priority level is determined based on a degree of match between the search keyword and a product name or a product description, the order of arrangement of the search keyword, a weight of each search keyword, and the like. In other cases, the display priority level is determined based on, for example, the number of sales of products, the number of reviews, an evaluation result, the number of bookmark registrations, a conversion rate (a number of orders divided by a number of times product page is displayed, or a number of times product page is displayed divided by a number of orders (refer to FIG. 7 described later)), the number of orders, or a stock.

Note that, when the search button 32 is clicked, the product images 35 of first N products among products satisfying the search condition are first displayed on the list screen 30. Specifically, the product images 35 of products having a display order of "1" to "N" among products satisfying the search condition are displayed on the list screen 30. Further, when the user scrolls down the list screen 30, the product images 35 of next N products among products satisfying the search condition are additionally displayed on the list screen 30. Specifically, in the case where the user scrolls down the list screen 30 when the product images 35 of the products having a display order of "1" to "N" is displayed, the product images 35 of products having a display order of "N+1" to "N+N" are additionally displayed on the list screen 30.

In the example illustrated in FIG. 2, the above mentioned "N" is set to "8". Thus, the product images 35 of first eight products among products satisfying the search condition are displayed on the list screen 30. Further, when the user scrolls down the list screen 30, the product images 35 of next eight products are additionally displayed on the list screen 30.

Figure 4:
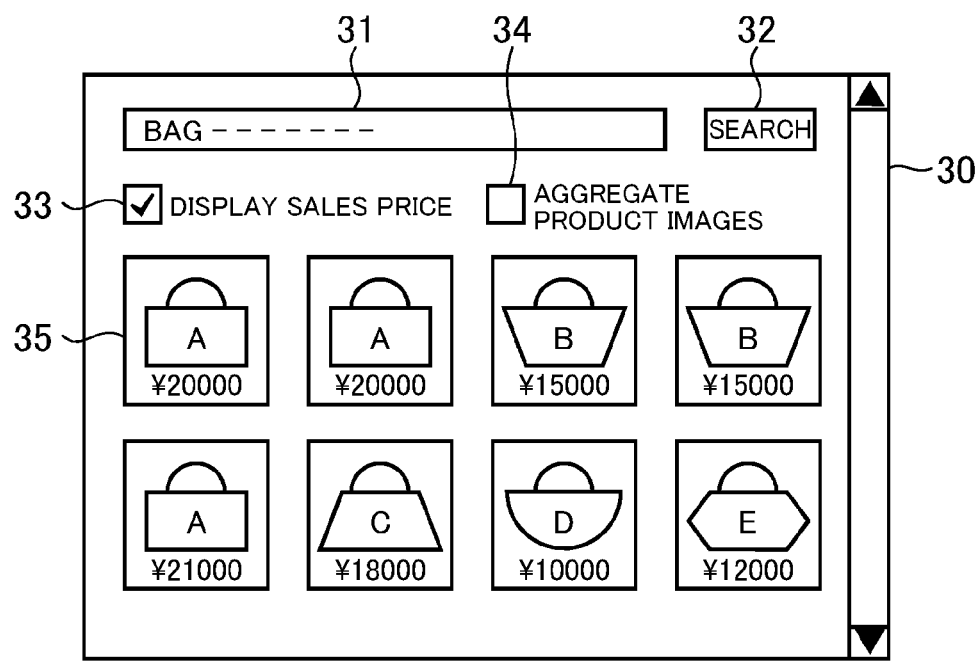
FIG. 4 is a diagram for illustrating another example of the list screen.

The price checkbox 33 is used for instructing display of sales prices of products. When the price checkbox 33 is checked, the sales prices of products are displayed in association with the product images 35. FIG. 4 is an illustration of an example of the list screen 30 when the price checkbox 33 is checked.

Note that, the sales prices of products are set for respective stores, and thus the sales prices of the same product may be different from one another. For example, in the example shown in FIG. 3, the sales price of the bag A is set to 20,000 yen at the stores S1 and S2, whereas the sales price of the bag A is set to 21,000 yen at the stores S3 and S4.

Figure 5:
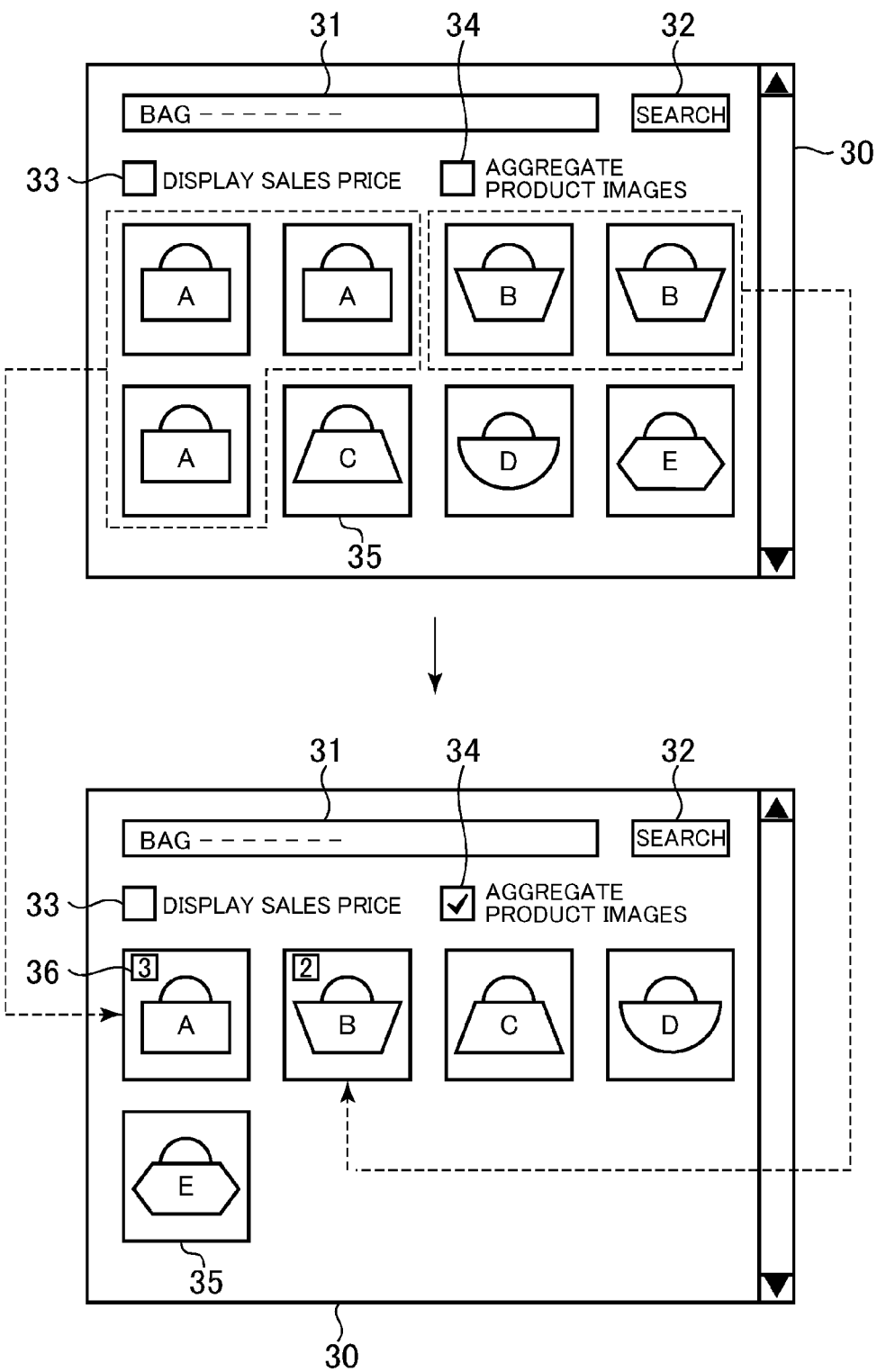
FIG. 5 is a diagram for illustrating an example of a change on the list screen.

The aggregation checkbox 34 is used for instructing aggregation of the product images 35. In the case where the aggregation checkbox 34 is checked, the plurality of the same or similar product images 35 are aggregated. FIG. 5 is an illustration of an example of a change in the list screen 30 of the case where the aggregation checkbox 34 is checked.

On the list screen 30 illustrated in FIG. 2, the product images 35 of the bags A sold by each of the stores S1, S2, and S3 (that is, product images 35 of bags A registered by each of stores S1, S2, and S3) are displayed, and those product images 35 are the same as or are similar to one another. Thus, the product images 35 of the bags A sold by each of the stores S1, S2, and S3 are aggregated into one representative product image. Note that, the "representative product image" is a product image displayed representing the plurality of aggregated product images 35.

When the plurality of the same or similar product images 35 are aggregated, any one of the plurality of aggregated product images 35 is set as the representative product image. For example, the product image 35 having the highest display priority level among the plurality of aggregated product images 35 is set as the representative product image. In this case, only the product image 35 set as the representative product image among the plurality of aggregated product images 35 is displayed on the list screen 30, and the product images 35 that are not set as the representative product image among the plurality of aggregated product images 35 are not displayed on the list screen 30.

For example, when the product images 35 of the bags A sold by each of the stores S1, S2, and S3 are aggregated, the display priority level of the bag A sold by the store S1 is the highest (refer to FIG. 3), and thus the product image 35 of the bag A sold by the store S1 (that is, product image 35 of bag A registered by store S1) is set as the representative product image. As a result, the product image 35 of the bag A registered by the store S1 is displayed on the list screen 30 and the product images 35 of the bags A registered by the stores S2 and S3 are not displayed on the list screen 30.

Note that, the representative product image may be set at random. In other cases, the representative product image may be determined based on probability information that is set such that a product having a higher display priority level has a higher probability to be determined as the representative product image.

Further, it may be configured that the representative product image is not determined from among the plurality of aggregated product images 35. A product image other than the plurality of aggregated product images 35 may be set as the representative product image. For example, a product image corresponding to the plurality of aggregated product images 35 may be acquired from among product images registered by an administrator of the virtual shopping mall in advance, and this product image may be set as the representative product image.

A sign 36 indicating the number of aggregated products is displayed on the product image 35 set as the representative product image in association therewith. In the example illustrated in FIG. 5, the product images 35 of the bags A sold by the stores S1, S2, and S3 are aggregated, and thus the sign 36 indicating "3" is superimposed on the representative product image of the bag A and is displayed. The user can grasp the fact that the product images 35 are aggregated and the number of aggregated product images 35 by referring to this sign 36.

Further, on the list screen 30 illustrated in FIG. 2, the product images 35 of the bags B sold by each of the stores S1 and S3 (that is, product images 35 of bag B registered by each of stores S1 and S3) are displayed, and those product images 35 are the same as or are similar to one another. Thus, the product images 35 of the bags B sold by each of the stores S1 and S3 are aggregated. Then, the sign 36 indicating "2" is associated with the representative product image of the bag B.

As described above, when the user scrolls down the list screen 30, the product images 35 of eight products that come next to the products being displayed on the list screen 30 are additionally displayed on the list screen. Thus, when the user scrolls down the list screen 30 after the change illustrated in FIG. 5, the product images 35 of products having a display order of "9" to "16" are additionally displayed.

Figure 6A:
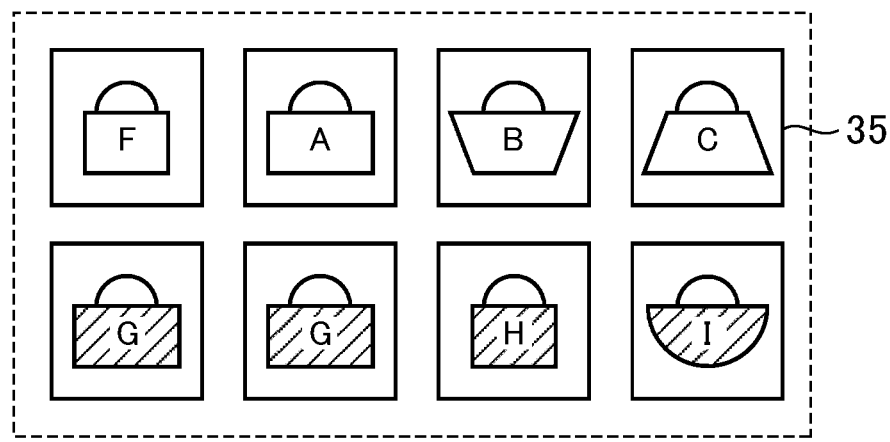
FIG. 6A is a diagram for illustrating an example of a list of product images to be additionally displayed.

In this case, the product images 35 to be additionally displayed are as illustrated in FIG. 6A. As illustrated in FIG. 6A, among the product images 35 to be additionally displayed, there are images that are the same as or are similar to the product images 35 that are already displayed.

Figure 6B:
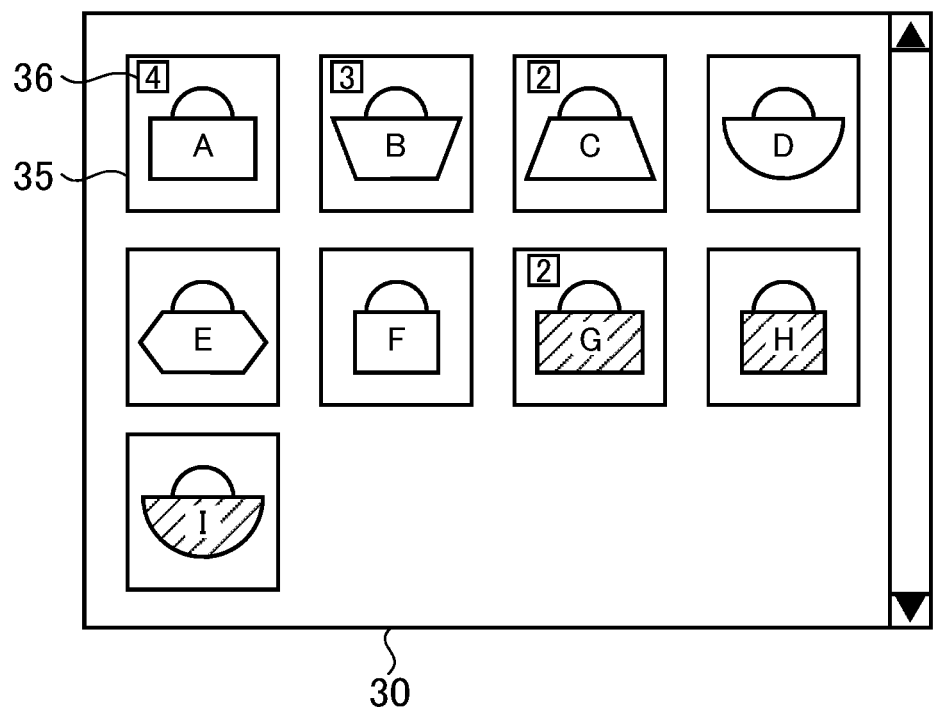
FIG. 6B is a diagram for illustrating another example of the list screen.

For example, among the product images 35 to be additionally displayed, there is a product image 35 of the bag A, and this product image 35 is the same as or is similar to the product image 35 of the bag A that is already displayed on the list screen 30. Thus, the aggregation of the bag A is executed as illustrated in FIG. 6B.

Similarly, among the product images 35 to be additionally displayed, there is a product image 35 of the bag C, and this product image 35 is the same as or is similar to the product image 35 of the bag C that is already displayed on the list screen 30. Thus, the aggregation of the bag C is executed as illustrated in FIG. 6B.

Further, among the product images 35 to be additionally displayed, there are a plurality of product images 35 that are the same as or are similar to one another. That is, among the product images 35 to be additionally displayed, there are two product images 35 of the bag G, and those product images 35 are the same as or are similar to one another. Thus, the aggregation of the bag G is executed as illustrated in FIG. 6B.

As described above, in the electronic commerce system 1, the plurality of the same or similar product images 35 are aggregated into the representative product image on the list screen 30. For example, any one of those plurality of product images 35 is displayed on the list screen 30 as the representative product image, and the other product images 35 among those plurality of product images 35 are not displayed on the list screen 30. There is a limitation on the number of product images 35 capable of being displayed on the list screen 30. However, according to the electronic commerce system 1, it is possible to increase the number of kinds of product images 35 to be displayed on the list screen 30.

When the user desires to have detail information on a product or to purchase a product, the user selects the product image 35 displayed on the list screen 30, to thereby select a desired product.

When the user selects any one of the product images 35 on the list screen 30 on which the aggregation checkbox 34 is not checked, namely, the list screen 30 in which the product images 35 are not aggregated (refer to FIG. 2 and FIG. 4), a product screen relating to a product corresponding to the product image 35 selected by the user is displayed on the display unit 25 of the user terminal 20.

Figure 7:
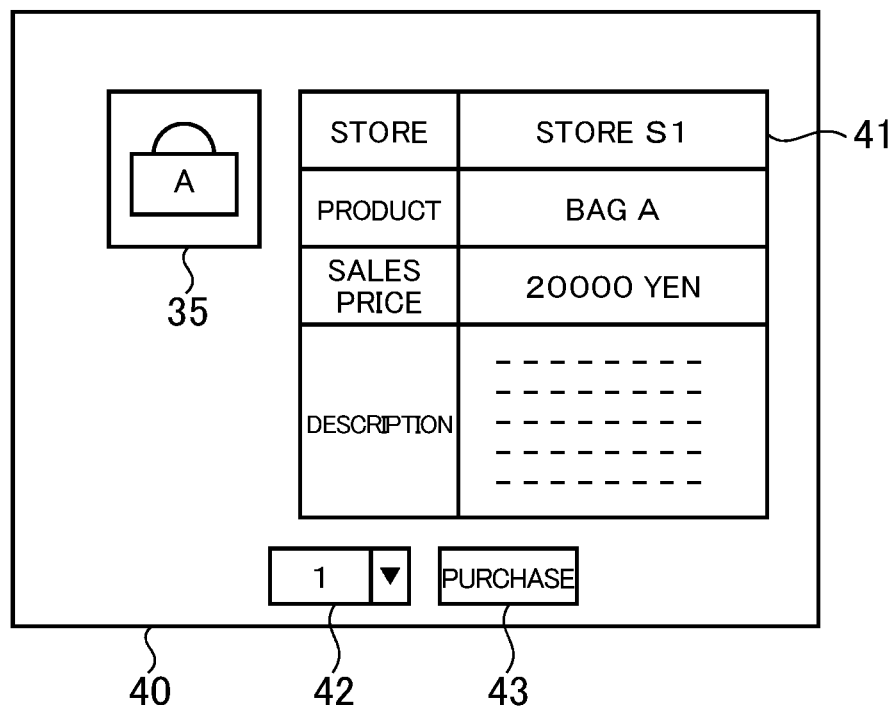
FIG. 7 is a diagram for illustrating an example of a product screen.

For example, when the user selects the product image 35 of the bag A registered by the store S1, the product screen of the bag A sold by the store S1 is displayed. FIG. 7 is an illustration of an example of the product screen in this case. As illustrated in FIG. 7, the product screen 40 includes the product image 35, a product information area 41, a selection box 42, and a purchase button 43.

The product information area 41 is an area for displaying detail information on a product. For example, a product name, a store name, a sales price, and a description are displayed in the product information area 41. The selection box 42 is used for selecting a purchase quantity and the purchase button 43 is a button for instructing purchase of a product. When the user selects a desired quantity in the selection box 42 and clicks on the purchase button 43, processing of purchasing a product is executed.

Also when the user selects the product image 35 that is not aggregated (e.g., the product images 35 of bags C, D, and E) on the list screen 30 on which the aggregation checkbox 34 is checked, namely, the list screen 30 on which the product images 35 are aggregated (refer to FIG. 5), the product screen 40 relating to a product corresponding to the product image 35 selected by the user is displayed. For example, when the user selects the product image 35 of the bag C registered by the store S1, the product screen 40 of the bag C sold by the store S1 is displayed.

On the other hand, when the user selects the representative product image, the product screen 40 is displayed, which relates to a product corresponding to the product image 35 determined as a display object to be displayed on the product screen 40 among the product images 35 aggregated into that representative product image.

Figure 8:
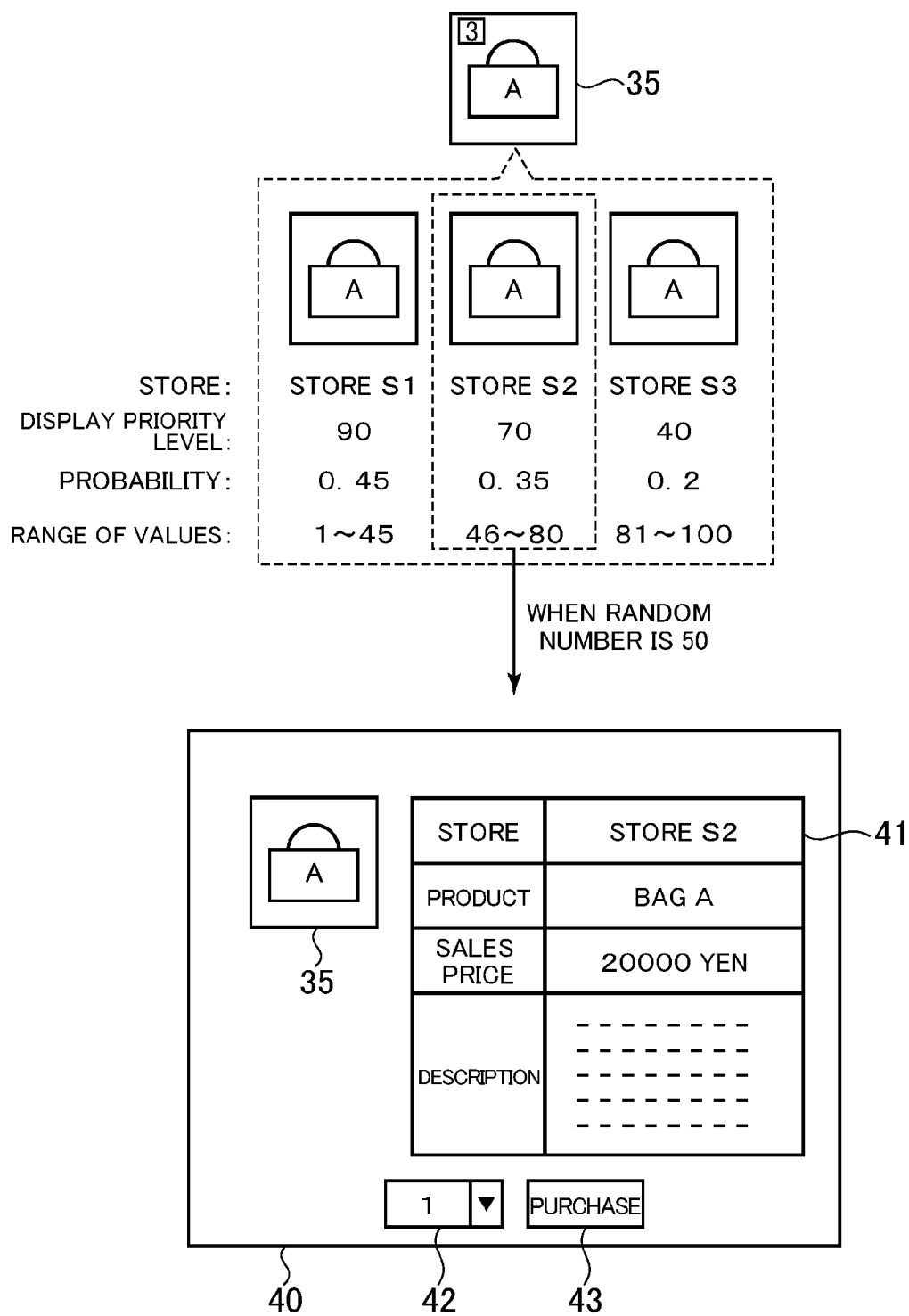
FIG. 8 is a diagram for illustrating an example of a method of determining a display object to be displayed on the product screen.

Now, a description is given of a method of determining a display object to be displayed on the product screen 40. FIG. 8 is a diagram for illustrating an example of this determination method. Note that, in FIG. 8, it is assumed that under a state in which the product images 35 of the bags A sold by the stores S1, S2, and S3 are aggregated (refer to FIG. 5), the user selects the representative product image of those aggregated product images 35.

When the plurality of product images 35 are aggregated into the representative product image, as to each of the aggregated product images 35, a probability that each product image 35 is determined as the display object to be displayed on the product screen 40 is set. The above probability of the product image 35 is set based on the display priority level of the product image 35. For example, for the product image 35 having a higher display priority level, the above probability is set higher.

When the display priority levels of the M respective aggregated product images 35 are set as $X_1, X_2, X_3, \ldots,$ and $X_M$, the above probabilities of the M respective aggregated product images 35 $Y_1, Y_2, Y_3, \ldots,$ and $Y_M$ are set based on the following expression.

$$Y_i = X_i/(X_1+X_2+X_3+ \ldots +X_M) \ (i{:}1, 2, 3, \ldots, M)$$

For example, when the display priority levels $X_1, X_2,$ and $X_3$ of the bags A sold by each of the stores S1, S2, and S3 are "90", "70", and "40", the above probabilities of the bags A sold by each of the stores S1, S2, and S3 are set as below.
 (1) bag A sold by store S1: 0.45
 (2) bag A sold by store S2: 0.35
 (3) bag A sold by store S3: 0.2
The display object to be displayed on the product screen 40 is determined based on the above probabilities of respective products and a random number. For example, when a random number in the range of from 1 to 100 is used, ranges of values corresponding to the bags A sold by each of the stores S1, S2, and S3 are set as below.
 (1) bag A sold by store S1: from 1 to 45
 (2) bag A sold by store S2: from 46 to 80
 (3) bag A sold by store S3: from 81 to 100
Then, for example, when the generated random number is "50", a product corresponding to the range of values to which the generated random number belongs, namely, the bag A sold by the store S2 is determined as the display object to be displayed on the product screen 40, and the product screen 40 relating to the bag A sold by the store S2 is set as a link destination of the representative product image on the list screen 30. In this case, when the user selects the representative product image on the list screen 30, the product screen 40 relating to the bag A sold by the store S2 is displayed on the user terminal 20.

Figures 9, 10:
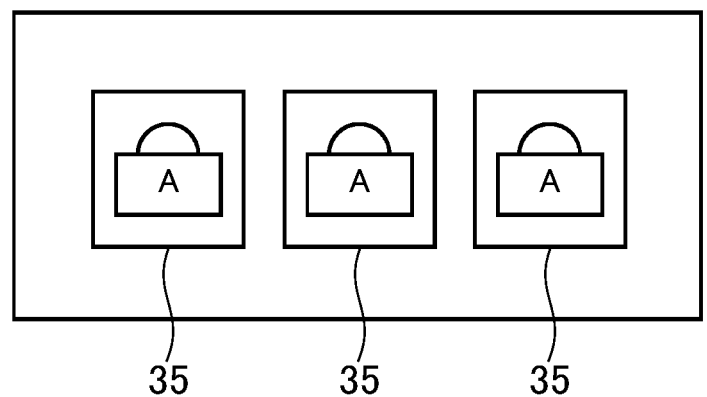
FIG. 9 is a diagram for illustrating an example of a list of product images of aggregated products.
FIG. 10 is a table for showing an example of a store information table.

Note that, when the sign 36 is clicked on the list screen 30 of the case where the product images 35 are aggregated (refer to FIG. 5), a list of the aggregated product images 35 is displayed. FIG. 9 is an illustration of an example of a list of the product images 35 displayed when the sign 36 associated with the representative product image of the bag A is clicked. In this manner, the user can check a list of the aggregated product images 35 by clicking on the sign 36.

Further, when the user selects anyone of the product images 35 from the list illustrated in FIG. 9, the product screen 40 relating to a product corresponding to the product image 35 selected by the user is displayed.

As described above, in the electronic commerce system 1, the plurality of the same or similar product images 35 are aggregated into the representative product image on the list screen 30. For example, any one of those plurality of product images 35 is displayed on the list screen 30 as the representative product image, and the other product images 35 among those plurality of product images 35 are not displayed on the list screen 30. There is a limitation on the number of product images 35 that can be displayed on the list screen 30. However, according to the electronic commerce system 1, it is possible to increase the number of kinds of product images 35 to be displayed on the list screen 30.

Further, in the electronic commerce system 1, when the user selects the representative product image, the product screen 40 relating to any one of the product images 35 aggregated into this representative product image is displayed (refer to FIG. 8). In this case, a product to be displayed on the product screen 40 is determined in consideration of not only the display priority level of the product image 35 being displayed on the list screen 30 (namely, product image 35 set as representative product image) but also the display priority levels of the product images 35 that are not displayed on the list screen 30 (namely, product images 35 that would have been displayed on the list screen 30 if not aggregated) among the aggregated product images 35.

In the electronic commerce system 1, when the user clicks on the sign 36 associated with the representative product image, a list of the product images 35 aggregated into this representative product image is displayed (refer to FIG. 9). Then, by selecting the product image 35 other than the representative product image from the list, the user can refer to the product screen 40 of a product corresponding to the product image 35 other than the representative product image. However, in this case, the user needs to perform two operations, namely, an operation of clicking on the sign 36 associated with the representative product image and an operation of selecting the product image 35 other than the representative product image from the list. In this respect, in the electronic commerce system 1, when the user selects the representative product image, the product screen 40 of a product corresponding to the product image 35 other than the representative product image is displayed. In this case, the user needs to perform a smaller number of operations compared with the above-mentioned case.

Note that, in the case of an aspect in which the product screen 40 of a product corresponding to the representative product image is always displayed when the user selects the representative product image, the product screen 40 of a product corresponding to the product image 35 other than the representative product image is less likely to be displayed, and thus there will be a partiality between the aggregated products. In other words, there will be a partiality between a plurality of stores selling the same product. In this respect, in the electronic commerce system 1, each time the list screen 30 in which the plurality of the same or similar product images 35 are aggregated is generated, a link destination of the representative product image is set based on a non-zero probability set for each of the plurality of aggregated product images 35. With this, it is possible to set up opportunities for all of the plurality of product images aggregated into the representative product image to be probabilistically displayed. Further, the probability is determined based on an element (e.g., display priority level (display position)) having an influence on how easily the user can recognize the product image 35 when it is displayed without an aggregation.

For example, the product image 35 having a high display priority level is displayed at a position that can be recognized easily by the user. Thus, the product image 35 having a high display priority level is the product image 35 that is outstanding when displayed on the list screen 30 (that is, when displayed without an aggregation). In this respect, in the electronic commerce system 1, the above probability of such a product image 35 is set high, and the product screen 40 of a product corresponding to such a product image 35, from among the aggregated product images 35, is preferentially displayed. With this, it is possible to reduce the partiality caused by the aggregation of the product images 35.

Figures 11, 12, 13:
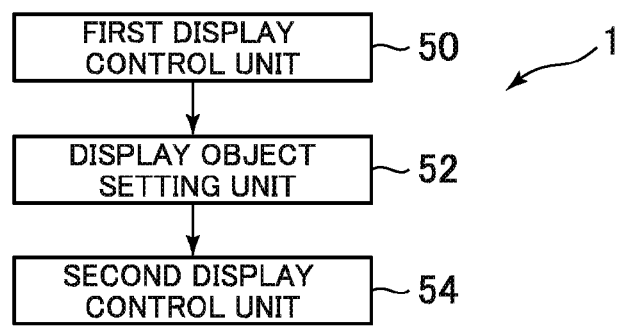
FIG. 11 is a table for showing an example of a product basic information table.
FIG. 12 is a table for showing an example of a product information table.
FIG. 13 is a functional block diagram for illustrating an example of functions implemented in the electronic commerce system.

In the following, a description is given of a configuration for implementing the functions described above. First, data stored in the database 15 is described. FIG. 10 to FIG. 12 are illustrations of examples of data stored in the database 15.

FIG. 10 is an illustration of an example of a store information table. The store information table shows information relating to stores opened in the virtual shopping mall. The store information table shown in FIG. 10 contains a "store ID" field, a "store name" field, and a "location" field. The "store ID" field shows information uniquely identifying a store (store ID). The "store name" field and the "location" field show the name and location of a store, respectively.

FIG. 11 is an illustration of an example of a product basic information table. The product basic information table shows basic information on a product. The product basic information table shown in FIG. 11 includes a "product ID" field, a "basic name" field, and a "category" field. The "product ID" field shows information uniquely identifying a product (product ID). The same products have the same product ID. The "basic name" field shows the basic name of a product. The "category" field shows the category of a product.

FIG. 12 is an illustration of an example of a product information table. The product information table shows information on products sold at each store. The product information table shown in FIG. 12 includes a "store ID" field, a "product ID" field, a "product name" field, a "sales price" field, a "product image" field, and a "product page" field.

The "store ID" field shows a store ID of a store. The "product ID" field shows a product ID of a product sold in a store. The "product name" field shows a product name registered by a store and the "sales price" field shows a sales price of a product registered by a store. In the electronic commerce system 1, each store is allowed to register the name of a product and the sales price at its own will.

The "product image" field shows information (e.g., file name or storage place) on a link to a product image registered by a store. The "product page" field shows information on a link to a product page registered by a store.

FIG. 13 is a functional block diagram for illustrating functional blocks implemented in the electronic commerce system 1. As illustrated in FIG. 13, the electronic commerce system 1 includes a first display control unit 50 (first display control means), a display object setting unit 52 (display object setting means), and a second display control unit 54 (second display control means).

Those functional blocks are implemented by the server 10 or the user terminal 20. For example, those functional blocks are implemented by the user terminal 20. That is, the control unit 21 of the user terminal 20 executes processing in accordance with a program to thereby function as those functional blocks.

The first display control unit 50 displays a first screen relating to a list of selection candidates serving as candidates to be selected by the user on the display unit 25. In particular, the first display control unit 50 displays, on the display unit 25, the first screen in which a plurality of the same or similar selection candidates are aggregated into one representative selection candidate.

For example, in the case of the example described above (refer to FIG. 2 to FIG. 9), the list screen 30 corresponds to an example of the "first screen" and a list of the product images 35 displayed on the list screen 30 (that is, list of product images 35 of products satisfying search condition) corresponds to an example of the "list of selection candidates". Further, the representative product image corresponds to an example of the "representative selection candidate".

As described above, on the list screen 30, the plurality of the same of similar product images 35 are aggregated into one representative product image. Note that, on the list screen 30, the plurality of product images 35 associated with the same product ID may be aggregated into one representative product image.

Further, on the list screen 30, any one of the plurality of aggregated product images 35 is set as the representative product image. For example, the product image 35 having the highest display priority level among the plurality of aggregated product images 35 is set as the representative product image. In other cases, it may be configured that any one of the plurality of aggregated products is set as the representative product image at random.

On the list screen 30, among the plurality of aggregated product images 35, only the product image 35 set as the representative product image is displayed, and among the plurality of aggregated product images 35, the product images 35 that are not set as the representative product image are not displayed.

The display object setting unit 52 sets, as a display object, any one of the plurality of selection candidates aggregated into the representative selection candidate. In this context, the "display object" is a selection candidate serving as an object to be displayed on a second screen displayed by the second display control unit 54 described later. The display object setting unit 52 sets the display object based on information on at least two selection candidates among the plurality of selection candidates aggregated into the representative selection candidate.

In the case of the example described above (refer to FIG. 2 to FIG. 9), the display object to be displayed on the product screen 40 corresponds to an example of the "display object" and the display priority level information on products corresponds to an example of the "information on selection candidates".

For example, the display object setting unit 52 generates probability information indicating probabilities of respective product images 35 aggregated into the representative product image to be determined as the display object to be displayed on the product screen 40. The display object setting unit 52 sets the above probability information based on the display priority levels of respective product images 35 aggregated into the representative product image. Specifically, the display object setting unit 52 sets the above probability information such that the product image 35 having a higher display priority level has a higher probability to be determined as the above display object. Then, the display object setting unit 52 determines the above display object based on the above probability information.

The second display control unit 54 displays, on the display unit 25, when the user selects any one of selection candidates from a list of selection candidates displayed on the first screen, a second screen relating to any one of the selection candidates based on the selection of the user.

When the user selects a selection candidate that is not aggregated into the representative selection candidate, the second display control unit 54 displays, on the display unit 25, a second screen relating to the selection candidate selected by the user.

On the other hand, when the user selects the representative selection candidate, the second display control unit 54 displays, on the display unit 25, a second screen relating to a selection candidate set as the display object among the plurality of selection candidates aggregated into the representative selection candidate.

In the case of the example described above (refer to FIG. 2 to FIG. 9), the product screen 40 corresponds to an example of the "second screen".

When the user selects a product image 35 that is not aggregated into the representative product image, the second display control unit 54 displays, on the display unit 25, the product screen 40 relating to a product corresponding to the product image 35 selected by the user.

On the other hand, when the user selects the representative product image, the second display control unit 54 displays, on the display unit 25, the product screen 40 relating to a product corresponding to the product image 35 set as the display object among the product images 35 aggregated into the representative selection candidate. In this case, the product screen 40 relating to a product corresponding to the product image 35 that is not set as the display object is not displayed.

Figure 14:
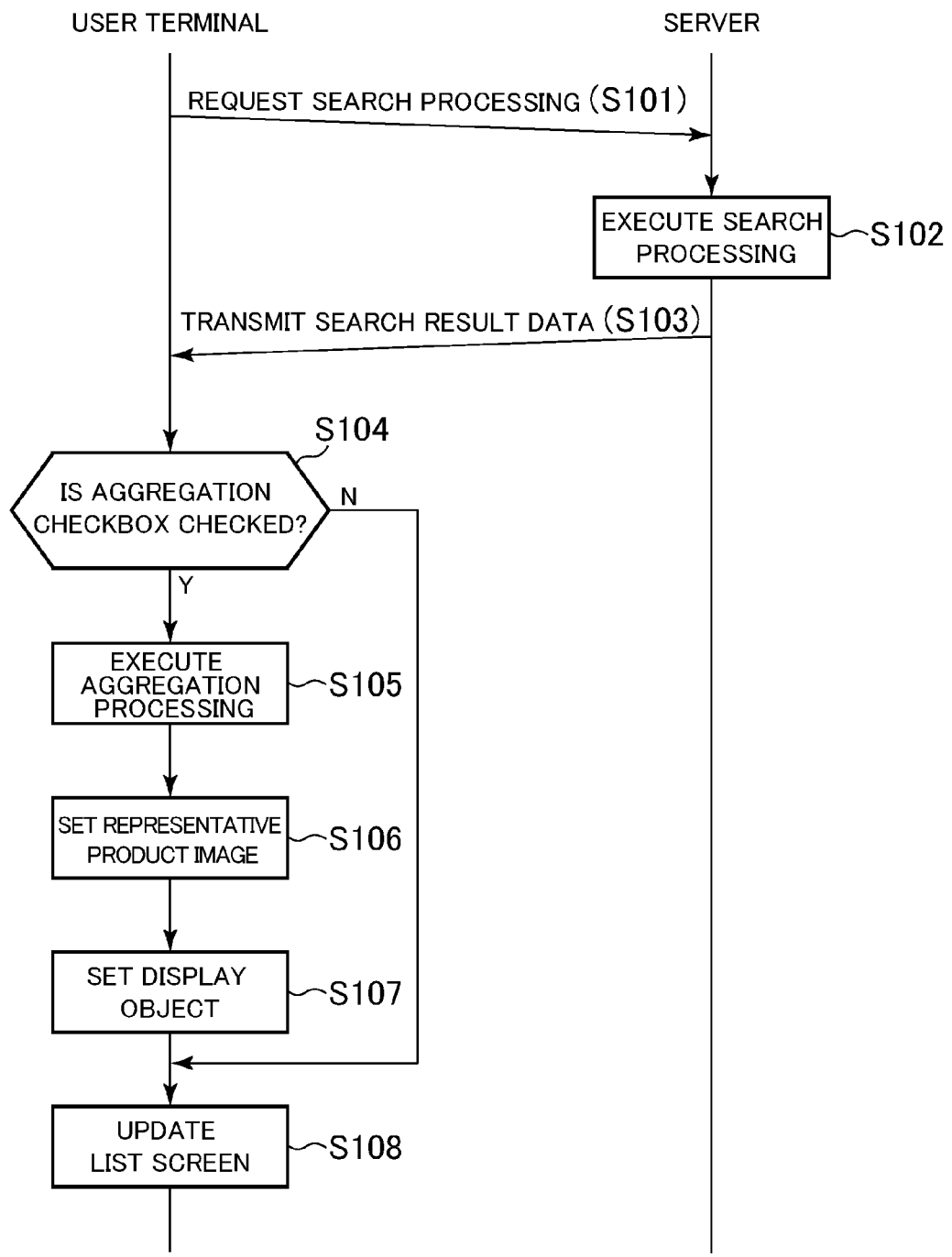
FIG. 14 is a diagram for illustrating an example of processing to be executed by the electronic commerce system.

Next, a description is given of processing for implementing the functional blocks described above. FIG. 14 is an illustration of an example of processing to be executed when the search button 32 on the list screen 30 is clicked.

When the search button 32 is clicked, as illustrated in FIG. 14, the control unit 21 of the user terminal 20 transmits, to the server 10, the search condition input to the input box 31, to thereby request the server 10 to execute search processing (S101). For example, the control unit 21 requests the server 10 to provide search result data indicating a list of first eight products among products satisfying the search condition.

When the server 10 receives the above request, the control unit 11 of the server 10 executes search processing (S102). That is, the control unit 11 accesses the database 15 to thereby acquire a list of products satisfying the search condition.

After that, the control unit 11 transmits the search result data indicating a list of products satisfying the search condition to the user terminal 20 (S103). In this case, the search result data indicating a list of first eight products among products satisfying the search condition is transmitted to the user terminal 20. This search result data contains information on the products satisfying the search condition (e.g., product ID, product name, sales price, information on link to product image, information on link to product page, and display priority level information).

The control unit 21 of the user terminal 20 receives the above search result data and stores this search result data in the storage unit 22. Further, the control unit 21 determines whether or not the aggregation checkbox 34 is checked (S104). When the aggregation checkbox 34 is not checked, the control unit 21 updates the list screen 30 based on the above search result data (S108). In this case, the aggregation of the product images 35 is not executed.

On the other hand, in the case where the aggregation checkbox 34 is checked, the control unit 21 executes aggregation processing (S105). That is, the plurality of the same or similar product images 35 are aggregated and put into one group.

In Step S105, the control unit 21 acquires, from the search result data, information on links to the product images 35 of respective products to acquire the product images 35 of respective products. Then, the control unit 21 compares one product image 35 with another product image 35 to thereby determine whether or not those product images 35 are the same as or are similar to each other. When the one product image 35 and the other product image 35 are the same as or are similar to each other, the control unit 21 aggregates those product images 35. In this case, a group of the plurality of the same or similar product images 35 (product image group) is acquired. Note that, a known method can be adopted as a method of determining whether or not the product images 35 are the same as or are similar to each other. Further, when it is determined whether or not the product images 35 are the same as or are similar to each other, the product images 35 may be compared with each other with their background portions eliminated.

In other cases, in Step S105, the control unit 21 acquires the product IDs of respective products from the search result data. Then, the control unit 21 determines whether or not the product ID of one product is the same as the product ID of another product. When the product ID of the one product is the same as the product ID of the other product, the control unit 21 aggregates the product images 35 of those products. In this case, a group of the product images 35 associated with the same product ID (product image group) is acquired.

Aggregation result data indicating the result of aggregation processing executed as described above is stored in the storage unit 22. Steps S106 to S108 described below are executed based on this aggregation result data.

After Step S105 is executed, the control unit 21 determines the representative product image for each product image group acquired by the aggregation processing of Step S105 (S106). Specifically, the control unit 21 determines a product image having the highest display priority level among the product images 35 contained in a product image group as the representative product image in that product image group.

After Step S106 is executed, the control unit 21 (display object setting unit 52) determines the display object to be displayed on the product screen 40 for each product image group acquired by the aggregation processing of Step S105 (S107).

In Step S107, the control unit 21 sets probability information indicating probabilities of respective product images 35 contained in a product image group to be determined as the above display object. That is, the control unit 21 sets the above probability information such that the product image 35 having a higher display priority level has a higher probability. Then, the control unit 21 determines anyone of the product images 35 contained in the product image group as the above display object based on the above probability information.

After Step S107 is executed, the control unit 21 (first display control unit 50) updates the list screen 30 based on the search result data and the aggregation result data (S108).

In this case, the control unit 21 executes display control processing described below for each product image group acquired by the aggregation processing of Step S105. That is, the control unit 21 displays the product image 35 set as the representative product image of a product image group on the list screen 30, and does not display the product images 35 that are not sets as the representative product image among the product images 35 contained in the product image group on the list screen 30. Further, the control unit 21 associates the product image 35 set as the representative product image of a product image group with information on a link to a product page of a product corresponding to the product image 35 set as the above display object of that product image group. In this manner, when the product image 35 set as the representative product image is clicked, the product screen of a product corresponding to the product image 35 set as the above display object is displayed on the display unit 25.

As described above, processing to be executed when the search button 32 on the list screen 30 is clicked is ended. Note that, also when the user scrolls down the list screen 30, processing that is similar to that illustrated in FIG. 14 is executed.

In this case, in Step S101, the control unit 21 requests the server 10 to provide a list of next eight products satisfying the search condition. Then, in Steps S102 and S103, the control unit 11 acquires search result data indicating a list of next eight products satisfying the search condition, and transmits this search result data to the user terminal 20.

For example, when the list screen 30, on which a list of products having a display order of "1" to "8" among products satisfying the search condition is displayed is scrolled down, the control unit 21 requests the server 10 to provide a list of products having a display order of "9" to "16" among the products satisfying the search condition. Then, the control unit 11 transmits, to the user terminal 20, search result data indicating a list of products having a display order of "9" to "16" among the products satisfying the search condition.

Further, in this case, Steps S104 to S108 are executed based on the newly received search result data (e.g., list of products having a display order of "9" to "16") and the search result data stored in the storage unit 22 (e.g., list of products having a display order of "1" to "8"). Note that, in this case, the search result data stored in the storage unit 22 (e.g., list of products having a display order of "1" to "8") is utilized to thereby reduce data traffic load between the server 10 and the user terminal 20.

Figure 15:
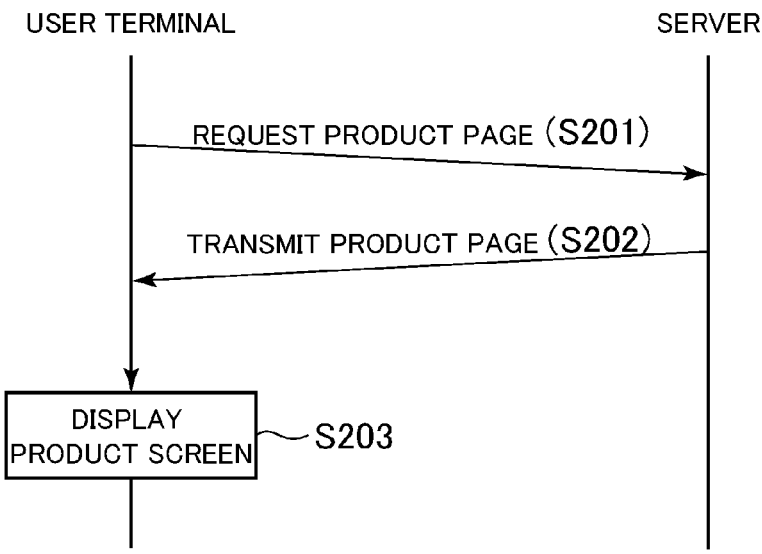
FIG. 15 is a diagram for illustrating another example of processing to be executed by the electronic commerce system.

FIG. 15 is an illustration of an example of processing to be executed when the user selects any one of the product images 35 displayed on the list screen 30.

When the user selects any one of the product images 35 displayed on the list screen 30, as illustrated in FIG. 15, the control unit 21 of the user terminal 20 requests the server 10 to provide a product page of a product corresponding to the product image 35 selected by the user (S201). Then, when the server 10 receives the above request, the control unit 11 of the server 10 transmits the product page to the user terminal 20 (S202). The control unit 21 of the user terminal 20 receives the product page and displays the product screen 40 on the display unit 25 (S203).

As described above, processing to be executed when the user selects any one of the product images 35 displayed on the list screen 30 is ended.

In the electronic commerce system 1 according to this embodiment described above, the plurality of the same or similar product images 35 are aggregated into one representative product image on the list screen 30 (refer to FIG. 5). There is a limitation on the number of product images 35 that can be displayed on the list screen 30. However, according to the electronic commerce system 1, it is possible to increase the number of kinds of product images 35 to be displayed on the list screen 30.

Further, according to the electronic commerce system 1, when the user selects the representative product image into which the plurality of product images 35 are aggregated, the product screen 40 relating to any one of the product images 35 aggregated into this representative product image is displayed (refer to FIG. 8). In this case, a product to be displayed on the product screen 40 is determined in consideration of not only the display priority level of the product image 35 being displayed on the list screen 30 (namely, representative product image) but also the display priority levels of the product images 35 that are not displayed on the list screen 30 (namely, product images 35 that would have been displayed on the list screen 30 if not aggregated) among the product images 35 aggregated into the representative product image.

In the electronic commerce system 1, when the user clicks on the sign 36 associated with the representative product image into which the plurality of product images 35 are aggregated, a list of the product images 35 aggregated into this representative product image is displayed (refer to FIG. 9). Then, by selecting the product image 35 other than the representative product image from the list, the user can refer to the product screen 40 of a product corresponding to the product image 35 other than the representative product image. However, in this case, the user needs to perform two operations, namely, an operation of clicking on the sign 36 associated with the representative product image and an operation of selecting the product image 35 other than the representative product image from the list. In this respect, in the electronic commerce system 1, also when the user selects the representative product image, the product screen 40 of a product corresponding to a product image 35 other than the representative product image can be displayed as well. In this case, the user needs to perform a smaller number of operations compared with the above-mentioned case.

Further, in the case of an arrangement in which the product screen 40 of a product corresponding to the representative product image is always displayed when the user selects the representative product image into which the plurality of product images 35 are aggregated, the product screen 40 of a product corresponding to the product image 35 other than the representative product image is less likely to be displayed, and thus there will be a partiality between the aggregated products. In other words, an there will be a partiality between a plurality of stores selling the same product. In this respect, according to the electronic commerce system 1, it is possible to reduce such a partiality.

Note that, the present invention is not limited to the embodiment described above.

[1] For example, processing may be executed in advance to determine whether or not the product images are the same or are similar to one another, and then data indicating the determination result may be stored in the database 15. That is, data indicating a combination of products whose product images are the same as or are similar to each other may be stored in the database 15 in advance. Then, the aggregation processing of Step S105 (FIG. 14) may be executed based on this data. With this, it is possible to alleviate the processing load of the aggregation processing of Step S105.

[2] For example, in Step S106 (FIG. 14), the product image 35 that is the most nice-looking among the product images 35 contained in a product image group may be determined as the representative product image in that product image group. In other words, the product image 35 that is the most nice-looking among the aggregated product images 35 may be set as the representative product image.

For example, the product image 35 that is the most nice-looking is determined by evaluating the product images 35 in accordance with predetermined evaluation criteria. The product image 35 is registered by each store, and thus a text such as "free shipping" or "greatly popular", or an ornament may be attached to the product image 35. Thus, the product image 35 having the least amount of texts or ornaments may be determined as the "the most nice-looking product image". For example, when there is a product image 35 without any text or ornament described above attached thereto, this product image 35 may be determined as the "the most nice-looking product image". Note that, a known method may be adopted as a method of detecting a text or an ornament described above that is attached to the product image 35.

With the configuration described above, it is possible to display the product image 35 that is as nice-looking as possible on the list screen 30.

[3] For example, Step S107 (FIG. 14) may be executed immediately before Step S201 (FIG. 15) is executed. That is, Step S107 may be omitted in FIG. 14. Then, when the user selects any one of the product images 35 displayed on the list screen 30, processing illustrated in FIG. 16 may be executed instead of the processing illustrated in FIG. 15.

Figure 16:
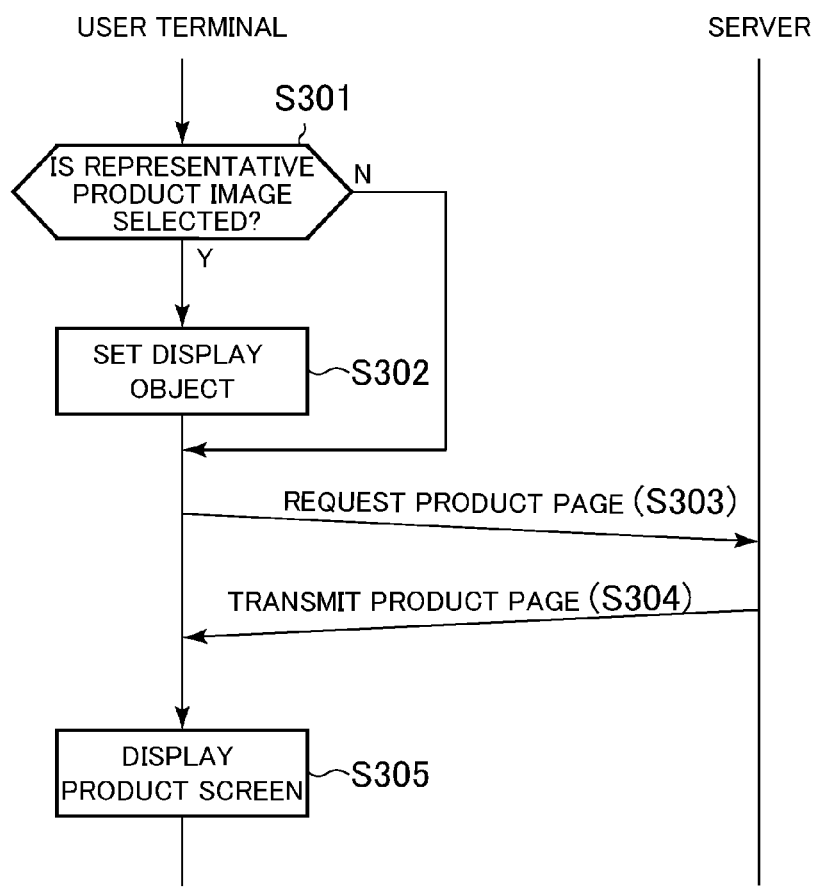
FIG. 16 is a diagram for illustrating another example of processing to be executed by the electronic commerce system.

In the processing illustrated in FIG. 16, when the user selects any one of the product images 35 displayed on the list screen 30, the control unit 21 determines whether or not the product image 35 selected by the user is the representative product image (S301).

When the product image 35 selected by the user is not the representative product image, the control unit 21 requests the server 10 to provide a product page of a product corresponding to the product image 35 selected by the user (S303).

On the other hand, when the product image 35 selected by the user is the representative product image (that is, product image 35 set as representative product image of product image group made by aggregating same or similar product images 35), the control unit 21 (display object setting unit 52) determines any one of the product images 35 contained in that product image group as the display object (S302), and requests the server 10 to provide a product page of a product corresponding to the product image 35 determined as the display object (S303). Note that, the processing of Step S302 is the same as that of Step S107 illustrated in FIG. 14.

When the server 10 receives the above request, the control unit 11 of the server 10 transmits the product page to the user terminal 20 (S304). The control unit 21 of the user terminal 20 receives the product page and displays the product screen 40 on the display unit 25 (S305).

[4] For example, all or a part of the processing described as being executed on the user terminal 20 may be executed on the server 10.

[4-1] For example, Step S105 (FIG. 14) may be executed on the server 10 after Step S102 is executed.

In the case of this modified example, in Step S101, information indicating whether or not the aggregation checkbox 34 is checked (that is, whether or not aggregation processing needs to be executed) is transmitted to the server 10 as well. Further, in Step S102, the control unit 11 of the server 10 executes search processing to thereby acquire a list of products satisfying the search condition. After that, in the case where the aggregation checkbox 34 is checked, the control unit 11 executes the aggregation processing. Then, the control unit 11 transmits the search result data and the aggregation result data to the user terminal 20.

[4-2] For example, Step S106 (FIG. 14) may also be executed on the server 10 after Step S102 is executed.

In the case of this modified example, after the aggregation processing is executed on the server 10, the control unit 11 of the server 10 determines the representative product image for each product image group acquired by the aggregation processing. Then, the control unit 11 transmits the determination result data indicating the determination result to the user terminal 20 together with the search result data and the aggregation result data.

[4-3] For example, Step S107 (FIG. 14) may be executed on the server 10 after Step S102 is executed. In the case of this example, after the aggregation processing is executed on the server 10, the control unit 11 of the server 10 (display object setting unit 52) determines the display object for each product image group acquired by the aggregation processing. Then, the control unit 11 transmits the determination result data indicating the determination result to the user terminal 20 together with the search result data and the aggregation result data. In this modified example, the display object setting unit 52 is implemented by the server 10.

Similarly, Steps S301 and S302 (FIG. 16) may be executed on the server 10 after Step S303 is executed. In this modified example, information indicating whether or not the user selects the representative product image is transmitted to the server from the user terminal 20. Then, in the case where the representative product image (that is, product image 35 set as representative product image of product image group made by aggregating same or similar product images 35) is selected by the user, the control unit 11 (display object setting unit 52) determines any one of the product images 35 contained in that product image group as the display object, and transmits a product page of a product corresponding to the product image 35 determined as the display object to the user terminal 20. Also in this modified example, the display object setting unit 52 is implemented by the server 10.

[4-4] Note that, the first display control unit 50 may be implemented by the server 10. That is, the control unit 11 of the server 10 (first display control unit 50) may transmit list screen data (list page) indicating the list screen 30 to the user terminal 20, to thereby display the list screen 30 on the display unit 25 of the user terminal 20.

[4-5] Further, in Steps S202 and S203 (FIG. 15), and in Steps S304 and S305 (FIG. 16), the control unit 11 of the server 10 transmits the product page to the user terminal 20, to thereby display the product screen 40 (product page) on the display unit 25 of the user terminal 20. Thus, the control unit 11 of the server 10 can be interpreted as corresponding to the second display control unit 54.

[5] For example, in the case where the price checkbox 33 and the aggregation checkbox 34 are both checked, the content of the aggregation processing may be changed from that of the case where only the aggregation checkbox 34 is checked.

Figure 17:
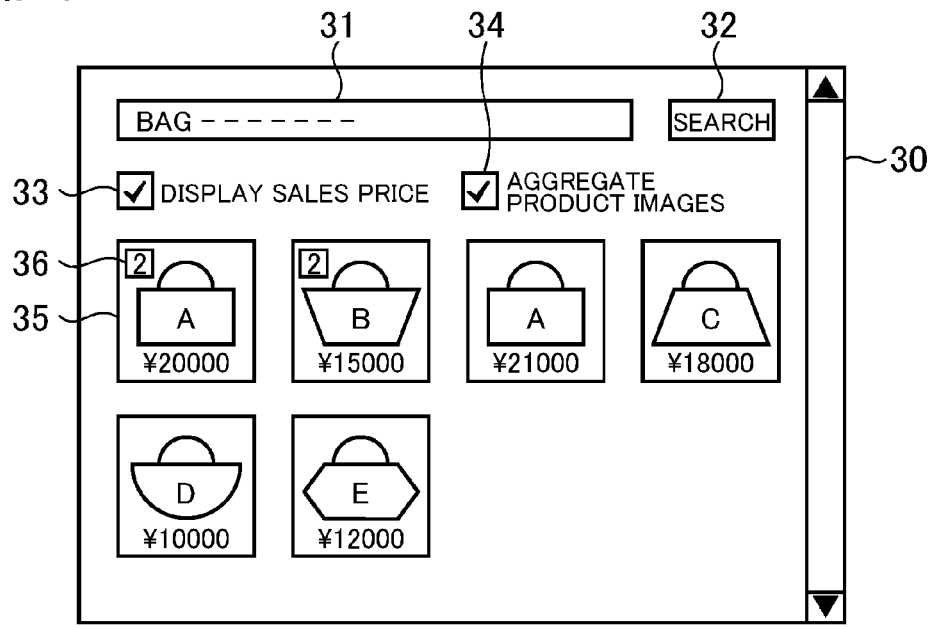
FIG. 17 is a diagram for illustrating another example of the list screen.

That is, when the price checkbox 33 and the aggregation checkbox 34 are both checked, a plurality of the same or similar product images 35 that are associated with the same sales prices may be aggregated. FIG. 17 is an illustration of an example of the list screen 30 in the case where the price checkbox 33 and the aggregation checkbox 34 are both checked on the list screen 30 illustrated in FIG. 2.

On the list screen 30 illustrated in FIG. 2, the product images 35 of the bags A sold by each of the stores S1, S2, and S3 are displayed, and those product images 35 are the same as or are similar to one another. Further, as shown in FIG. 3, the sales prices of the bags A at the stores S1 and S2 (20,000 yen) are equal to each other, and the sales price of the bag A at the store S3 (21,000 yen) is different from the sales prices of the bags A at the stores S1 and S2. Thus, as illustrated in FIG. 17, the bags A sold by each of the stores S1 and S2 are aggregated.

Further, on the list screen 30 illustrated in FIG. 2, the product images 35 of the bags B sold by each of the stores S1 and S2 are displayed, and those product images 35 are the same as or are similar to one another. Further, as shown in FIG. 3, the sales prices of the bags B at the stores S1 and S2 (15,000 yen) are equal to each other. Thus, as illustrated in FIG. 17, the bags B sold by each of the stores S1 and S2 are aggregated.

Note that, in the case where the price checkbox 33 and the aggregation checkbox 34 are both checked, the plurality of the same or similar product images 35 that are associated with the same or similar sales prices may be aggregated. Note that, in this case, when the difference between the sales price of one product and the sales price of another product is less than a threshold value, the sales prices of those products may be determined as being similar to each other.

In other cases, in the case where the price checkbox 33 and the aggregation checkbox 34 are both checked, the plurality of product images 35 that are associated with the same sales price and also associated with the same product ID may be aggregated. In other cases, the plurality of product images 35 that are associated with the same or similar sales prices and also associated with the same product ID may be aggregated.

With the configuration described above, the aggregation of the product images 35 is executed in consideration of the sales prices of products when the user pays his or her attention on the sales prices of products.

[6] For example, the display object setting unit 52 may set the display object based on information on display sizes of at least two product images 35 among the plurality of product images 35 aggregated into the representative product image.

Figure 18:
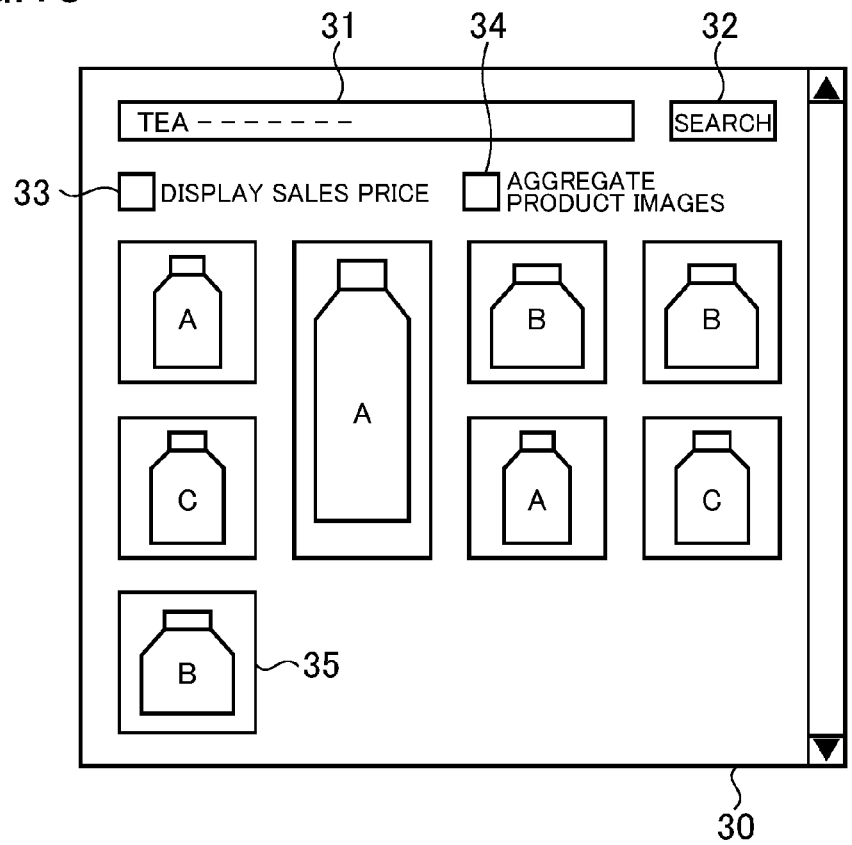
FIG. 18 is a diagram for illustrating another example of the list screen.

FIG. 18 is an illustration of an example of the list screen 30. On the list screen 30 illustrated in FIG. 18, the product images 35 do not have a uniform display size. That is, the product image 35 having a longer vertical side compared with those of the other product images 35 is displayed.

In such a case, the display object setting unit 52 sets, based on information on display sizes of respective product images 35, probability information indicating probabilities of respective product images 35 aggregated into the representative product image to be determined as the display object to be displayed on the product screen 40. Specifically, the display object setting unit 52 sets the above probability information such that a product having a larger display size of the product image 35 has a higher probability to be determined as the above display object. The method of setting this probability information is similar to that of the case where the probability information is set based on the display priority level information on the product images 35.

The display object setting unit 52 determines any one of the plurality of product images 35 aggregated into the representative product image as the display object based on the probability information set as described above.

As described above, when the product images 35 are aggregated, there will be a partiality between the aggregated products. That is, there will be a partiality between a plurality of stores selling the same product. In this respect, in this modified example, each time the list screen 30 in which the plurality of the same or similar product images 35 are aggregated is generated, a link destination of the representative product image is set based on a non-zero probability set for each of the plurality of aggregated product images 35. With this, it is possible to set up opportunities for all of the plurality of product images 35 aggregated into the representative product image to be probabilistically displayed. Further, the probability is determined based on an element (i.e., display size) having an influence on how easily the user can recognize the product image 35 when it is displayed without an aggregation.

For example, the product image 35 having a large display size is displayed largely on the list screen 30. Thus, the product image 35 having a large display size is a product image 35 that is outstanding when displayed on the list screen 30 (that is, when displayed without aggregation). In this respect, in this modified example, the above probability of such a product image is set higher, and the product screen 40 of a product corresponding to the product image 35 as described above is preferentially displayed from among the aggregated product images 35. With this, it is possible to reduce the partiality caused by the aggregation of the product images 35.

[7] For example, as to each of the product images 35 aggregated into the representative product image, the display object setting unit 52 may set an upper limit number of times that the product image 35 in question is determined as the display object to be displayed on the product screen 40. Then, the display object setting unit 52 may determine the above display object such that a cumulative number of times that the product image 35 is determined as the above display object does not exceed the upper limit number of times of that product image 35.

For example, the display object setting unit 52 sets the above upper limit number of times for each of the product images 35 aggregated into the representative product image based on information (e.g., display priority level information or display size information) on at least two product images 35 among the product images 35 aggregated into this representative product image. Specifically, the display object setting unit 52 sets the above upper limit numbers of times for the product images 35 such that the product image 35 having a higher display priority level has a higher upper limit number of times.

For example, when the M product images 35 are aggregated, and those M product images 35 have display priority levels of $X_1, X_2, X_3, \ldots,$ and $X_M$, the above upper limit numbers of times $Z_1, Z_2, Z_3, \ldots,$ and $Z_M$ for the above M product images 35 are set based on the following expression. Note that, in the following expression, "10" is a predetermined constant number.

$$Z_i = 10*(X_i/(X_1+X_2+X_3+\ldots+X_M))\ (i:1, 2, 3)$$

Now, for example, a case as illustrated in FIG. 5, namely, a case where the bags A sold by the stores S1, S2, and S3 are aggregated is assumed. When the display priority levels $X_1$, $X_2$, and $X_3$ of the bags A respectively sold by the stores S1, S2, and S3 are "90", "70", and "40", the above upper limit numbers of times for the bags A respectively sold by the stores S1, S2, and S3 are set as given below (rounded off to closest whole number).

(1) bag A sold by store S1: five times
(2) bag A sold by store S2: four times
(3) bag A sold by store S3: two times In such a case, the display object setting unit 52 sets the above display object in order from the product image 35 having a higher display priority level to the product image 35 having a lower display priority level and such that the cumulative number of times that each product image 35 is determined as the display object does not exceed the above upper limit number of times.

That is, the display object setting unit 52 sets the bag A sold by the store S1 as the above display object until the cumulative number of times that the bag A sold by the store S1 is determined as the above display object reaches its upper limit number of times (five times).

Then, when the number of times that the bag A sold by the store S1 is determined as the above display object reaches the upper limit number of times (five times), the display object setting unit 52 sets the bag A sold by the store S2 as the above display object until the number of times that the bag A sold by the store S2 is determined as the above display object reaches its upper limit number of times (four times).

Further, when the number of times that the bag A sold by the store S2 is determined as the above display object reaches the upper limit number of times (four times), the display object setting unit 52 sets the bag A sold by the store S3 as the above display object until the number of times that the bag A sold by the store S3 is determined as the above display object reaches its upper limit number of times (two times). Note that, when the number of times that the bag A sold by the store S3 is determined as the above display object reaches the upper limit number of times (two times), the above cumulative numbers of times for the bags A respectively sold by the stores S1, S2, and S3 are reset to zero.

Also with the configuration described above, it is possible to reduce the partiality between a plurality of stores selling the same product.

[8] For example, information indicating a product set as the display object to be displayed on the product screen 40 (display object information) may be stored in the storage unit. Then, in the case where the list screen 30 is displayed again after the product screen 40 relating to a product set as the display object is displayed, the display object setting unit 52 may again set a product (product image 35) indicated by the display object information as the above display object.

With this, the user can refer to the product screen 40 of the same product again when the user clicks on the representative product image again.

[9] For example, when the user owns a coupon of a product Y sold by a store X and the product image 35 of that product Y is contained in the plurality of aggregated product images 35, the display object setting unit 52 may preferentially set the product Y sold by the store X as the display object to be displayed on the product screen 40. With this, the product screen 40 of a product a coupon of which is owned by the user is preferentially displayed from among aggregated products.

Further, for example, in the case where the user has used the store X in the past and the product image 35 of a product sold by the store X is included in the plurality of aggregated product images 35, the display object setting unit 52 may preferentially set the product sold by the store X as the display object to be displayed on the product screen 40. With this, the product screen 40 of a product sold by a store that has been used by the user in the past is preferentially displayed from among aggregated products.

[10] For example, in the electronic commerce system 1, data such as electronic book data, music data, and video data may be sold as a product as well as things such as a bag and a drink. Further, in the electronic commerce system 1, a service may be sold as well as a product.

[11] In the above, an example of a case in which the present invention is applied to the electronic commerce system has been described. That is, an example of a case in which the information processing system according to an embodiment of the present invention is implemented in an electronic commerce system has been described. However, the present invention can also be applied to an information processing system other than an electronic commerce system. The present invention can be applied to an information processing system in which a user selects any one of selection candidates from a list of selection candidates.

REFERENCE SIGNS LIST 1 electronic commerce system, 2 communication network, 4 store terminal, 10 server, 11, 21 control unit, 12, 22 storage unit, 13, 23 communication unit, 14 optical disc drive unit, 20 user terminal, 24 operation unit, 25 display unit, 26 audio output unit, 30 list screen, 31 input box, 32 search button, 33 price checkbox, 34 aggregation checkbox, 35 product image, 36 sign, 40 product screen, 41 product information area, 42 selection box, 43 purchase button, 50 first display control unit, 52 display object setting unit, 54 second display control unit

The invention claimed is:
1. An information processing system, comprising:
a display;
a processor; and
a memory device that stores a plurality of instructions,
wherein when the processor executes the instructions in the memory device, the processor is operable to:
cause the display to show, a first screen relating to a list of selection candidates, the first screen being a screen on which a plurality of the same or similar selection candidates are aggregated into one representative selection candidate;
set, as a display object to be displayed on a second screen that is displayed when a user selects the representative selection candidate, any one of the plurality of selection candidates that are aggregated into the representative selection candidate based on information on at least two selection candidates among the plurality of selection candidates; and cause the display to show, when the user selects the representative selection candidate, the second screen relating to the one of the plurality of selection candidates set as the display object, wherein the processor is operable to:

set probability information indicating probabilities of each of the plurality of selection candidates that are aggregated into the representative selection candidate to be determined as the display object based on the information on the at least two selection candidates among the plurality of selection candidates; and determine, as the display object, any one of the plurality of selection candidates that are aggregated into the representative selection candidate based on the probability information.

2. The information processing system according to claim 1, wherein a list of products or services are displayed on the first screen as the list of selection candidates, wherein the processor is operable to cause the display to show, in accordance with an instruction of the user, the first screen on which sales prices of the respective products or services are displayed, and wherein the processor is operable to cause the display to show, when the sales prices of the respective products or services are displayed on the first screen, the first screen in which a plurality of the same or similar products or services having the same or similar sales prices are aggregated into the representative selection candidate.

3. The information processing system according to claim 1, wherein the processor is operable to:

acquire a plurality of the selection candidates that are display objects to be displayed on the first screen, determine whether or not a plurality of the same or similar selection candidates are included in the plurality of selection candidates, and aggregate, when it is determined that a plurality of the same or similar selection candidates are included in the plurality of selection candidates, the plurality of the same or similar selection candidates into one representative selection candidate to display on the first screen.

4. The information processing system according to claim 1, wherein a list of products or services are displayed on the first screen as the list of selection candidates, wherein the processor is operable to cause the display to show the second screen on which the user can select products or services set as the display object as products or services to be purchased.

5. An information processing system, comprising:

a display;

a processor; and a memory device that stores a plurality of instructions, wherein when the processor executes the instructions in the memory device, the processor is operable to:

cause the display to show a first screen relating to a list of selection candidates, the first screen being a screen on which a plurality of the same or similar selection candidates are aggregated into one representative selection candidate;

set, as a display object to be displayed on a second screen that is displayed when a user selects the representative selection candidate, any one of the plurality of selection candidates that are aggregated into the representative selection candidate based on information on at least two selection candidates among the plurality of selection candidates; and cause the display to show, when the user selects the representative selection candidate, the second screen relating to the one of the plurality of selection candidates set as the display object, wherein the processor is operable to:

set an upper limit on a number of times that each of the plurality of selection candidates that are aggregated into the representative selection candidate is determined as the display object, based on the information on the at least two selection candidates among the plurality of selection candidates; and determine, as the display object, any one of the plurality of selection candidates that are aggregated into the representative selection candidate such that a cumulative number of times that the one of the plurality of selection candidates is determined as the display object does not exceed the upper limit of the one of the plurality of selection candidates.

6. An information processing system, comprising:

a display;

a processor; and a memory device that stores a plurality of instructions, wherein when the processor executes the instructions in the memory device, the processor is operable to:

cause the display to show a first screen relating to a list of selection candidates, the first screen being a screen on which a plurality of the same or similar selection candidates are aggregated into one representative selection candidate;

set, as a display object to be displayed on a second screen that is displayed when a user selects the representative selection candidate, any one of the plurality of selection candidates that are aggregated into the representative selection candidate based on information on at least two selection candidates among the plurality of selection candidates;

cause the display to show, when the user selects the representative selection candidate, the second screen relating to the one of the plurality of selection candidates set as the display object; and store display object information indicating the one of the plurality of selection candidates set as the display object in a storage, wherein the processor is operable to set, when the first screen is displayed again after the second screen relating to the one of the plurality of selection candidates set as the display object is displayed, a selection candidate indicated by the display object information as the display object again.

* * * * *